(12) United States Patent
Hwang et al.

(10) Patent No.: US 10,895,998 B2
(45) Date of Patent: Jan. 19, 2021

(54) CONTROLLER AND OPERATING METHOD THEREOF

(71) Applicant: SK hynix Inc., Gyeonggi-do (KR)

(72) Inventors: Mi Hyun Hwang, Seoul (KR); Jong Chern Lee, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 76 days.

(21) Appl. No.: 16/391,535

(22) Filed: Apr. 23, 2019

(65) Prior Publication Data

US 2020/0073583 A1 Mar. 5, 2020

(30) Foreign Application Priority Data

Sep. 5, 2018 (KR) .................. 10-2018-0105679

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0679; G06F 3/0614; G06F 3/0655
See application file for complete search history.

(56) References Cited

U.S. PATENT DOCUMENTS

| 2012/0233511 A1* | 9/2012 | Kim ............... G01R 31/318547 |
| | | 714/726 |
| 2016/0078051 A1* | 3/2016 | Kim ..................... G06F 16/245 |
| | | 707/690 |
| 2020/0241482 A1* | 7/2020 | Sinha ................... G06N 3/0454 |

FOREIGN PATENT DOCUMENTS

KR 10-2012-0102876 9/2012
KR 10-2015-0097074 8/2015

* cited by examiner

*Primary Examiner* — Baboucarr Faal
(74) *Attorney, Agent, or Firm* — IP & T Group LLP

(57) ABSTRACT

A storage device for outputting a pattern for analyzing input data includes: a data receiver configured to sequentially receive a plurality of input data, each including a pattern for identifying data for a corresponding input period of a plurality of input periods; a pattern determiner configured to set, as a reference pattern, a pattern included in any one data among the plurality of input data, and generate a control signal based on whether correspondence data including the same pattern as the reference pattern is input; and a data storage configured to store the plurality of input data in a sequence in which the plurality of input data are input, and, when the correspondence data is stored, output capture data that are stored data including the correspondence data based on the control signal.

19 Claims, 9 Drawing Sheets

| | ACT | WT | RD | REFRESH |
|---|---|---|---|---|
| CS | L | L | L | L |
| RAS | L | H | H | L |
| CAS | H | L | L | L |
| WE | H | L | H | H |

| | ACT | WT | RD | REFRESH |
|---|---|---|---|---|
| CS | 0 | 0 | 0 | 0 |
| RAS | 0 | 1 | 1 | 0 |
| CAS | 1 | 0 | 0 | 0 |
| WE | 1 | 0 | 1 | 1 |

REP_PAT

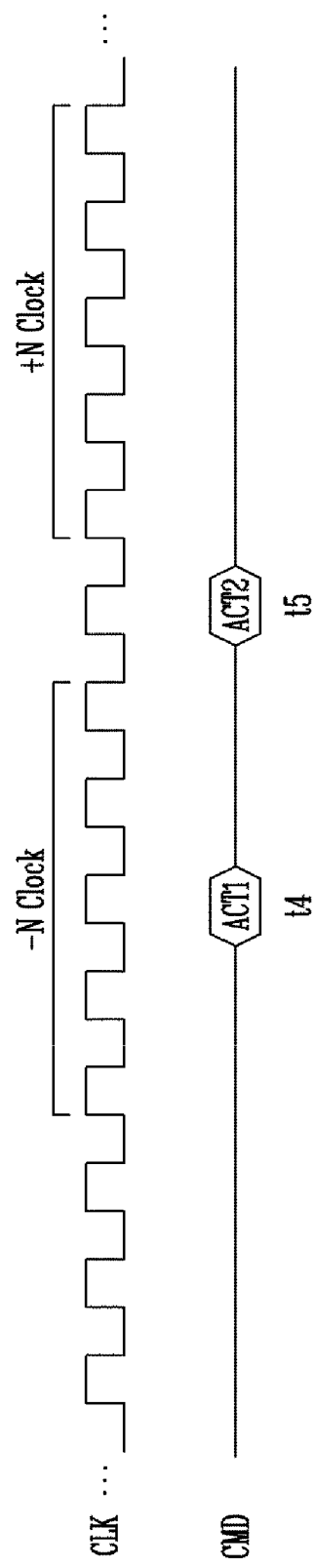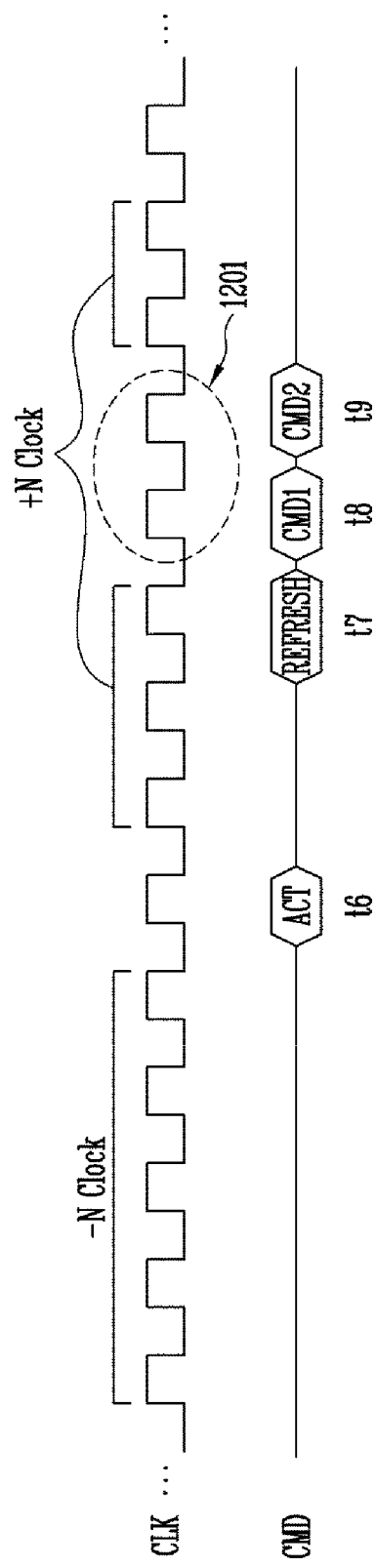

US 10,895,998 B2

CONTROLLER AND OPERATING METHOD THEREOF

CROSS-REFERENCE TO RELATED APPLICATION

The present application claims priority under 35 U.S.C. § 119(a) to Korean patent application number 10-2018-0105679, filed on Sep. 5, 2018, which is incorporated herein by reference in its entirety.

BACKGROUND

Field of Invention

The present disclosure generally relates to an electronic device, and more particularly, to a controller and an operating method thereof.

Description of Related Art

A storage device stores data under the control of a host device such as a computer, a smart phone or a smart pad. The storage device includes a device for storing data on a magnetic disk, such as a hard disk drive (HDD), or a device for storing data on a semiconductor memory, i.e., a nonvolatile memory, such as a solid state drive (SSD) or a memory card.

The storage device may include a memory device for storing data and a memory controller for controlling the memory device. The memory device is classified into a volatile memory device and a nonvolatile memory device. The nonvolatile memory device includes any of a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM).

SUMMARY

Embodiments provide a controller capable of outputting a pattern for analyzing input data and an operating method of the controller.

In accordance with an aspect of the present disclosure, there is provided a controller including: a data receiver configured to sequentially receive a plurality of input data, each including a pattern for identifying data for a corresponding input period of a plurality of input periods; a pattern determiner configured to set, as a reference pattern, a pattern included in any one data among the plurality of input data, and generate a control signal based on whether correspondence data including the same pattern as the reference pattern is input; and a data storage configured to store the plurality of input data in a sequence in which the plurality of input data are input, and, when the correspondence data is stored, output capture data that are stored data including the correspondence data based on the control signal.

In accordance with another aspect of the present disclosure, there is provided a controller including: a data receiver configured to receive a plurality of input data, each including a pattern for identifying data; a pattern determiner configured to set, reference patterns, patterns included in at least two data among the plurality of input data, and generate a control signal, based on whether correspondence data including the same patterns as the reference patterns are input; and a data storage configured to store the plurality of input data in a sequence in which the plurality of input data are input, and, when the correspondence data are stored, output capture data that are stored input data including the correspondence data, based on the control signal.

In accordance with another aspect of the present disclosure, there is provided a method for operating a controller, the method including: sequentially receiving a plurality of input data, each including a pattern for identifying data for a corresponding input period of a plurality of input periods; setting, as a reference pattern, a pattern included in any one data among the plurality of input data; generating a control signal, based on whether correspondence data including the same pattern as the reference pattern is input; storing the plurality of input data in a shift register in a sequence in which the plurality of input data are input; and when the correspondence data among the plurality of input data is stored, outputting capture data that are stored data including the correspondence data based on the control signal.

In accordance with another aspect of the present disclosure, there is provided a memory system including: a memory device; and a controller suitable for: sequentially receiving a plurality of input data from a host, the plurality of input data including a pattern for identifying data; sequentially storing the plurality of input data; determining whether a pattern in the plurality of input data corresponds to a reference pattern; and when it is determined that the pattern corresponds to the reference pattern, outputting, to the memory device, data corresponding to the pattern, among the stored input data.

BRIEF DESCRIPTION OF THE DRAWINGS

Various embodiments will now be described more fully hereinafter with reference to the accompanying drawings; however, aspects and features may be embodied in different forms and thus the present invention should not be construed as limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Throughout the specification, reference to "an embodiment," "another embodiment" or the like is not necessarily to only one embodiment, and different references to any such phrase are not necessarily to the same embodiment(s).

FIG. 11 is a diagram illustrating a method for outputting capture data in accordance with an embodiment of the present disclosure.

FIG. 12 is a diagram illustrating a method for outputting capture data in accordance with an embodiment of the present disclosure.

DETAILED DESCRIPTION

Figure 1:
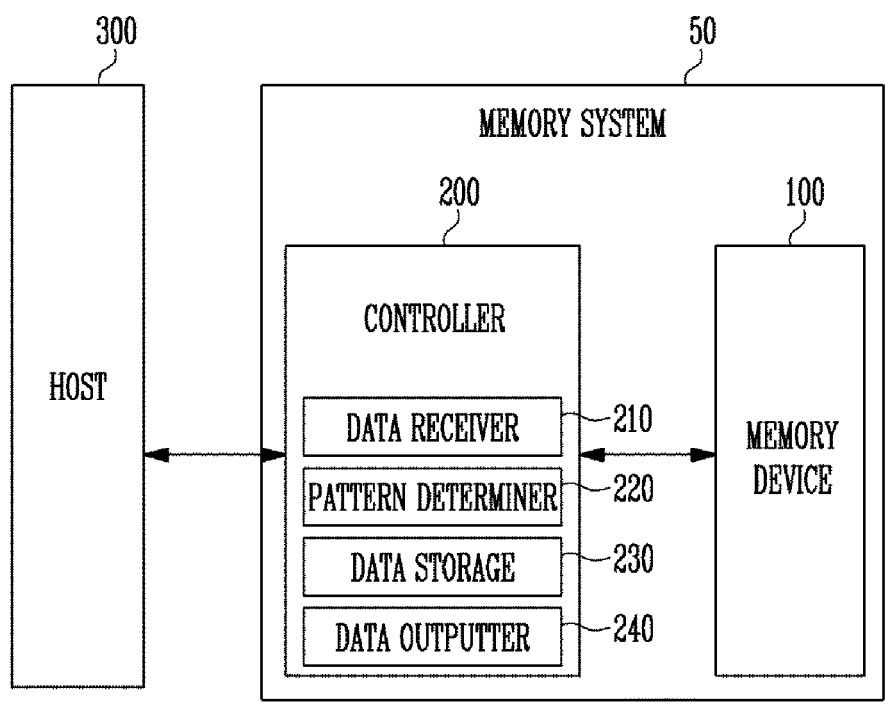
FIG. 1 is a diagram illustrating a memory system in accordance with an embodiment of the present disclosure.

The specific structural or functional description disclosed herein is for the purpose of describing embodiments of the present disclosure. The embodiments can be implemented in various forms and ways, and thus the present invention is not limited to the embodiments set forth herein.

The embodiments of the present disclosure described and illustrated herein can be variously modified. Thus, the present invention is not limited to the specifics disclosed. Rather, the present invention includes all changes, equivalents, or substitutes that do not depart from the spirit and technical scope of the present disclosure.

While terms such as "first" and "second" may be used to identify various components, such components are not limited by the above terms. The above terms are used only to distinguish one component from another that otherwise have the same or similar names. For example, a first component in one instance may be referred to as a second component in another instance and vice versa without departing from the scope of rights of the present disclosure.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Other expressions describing relationships between components such as "between," "immediately between" or "adjacent to" and "directly adjacent to" may be construed similarly.

The terms used in the present application are merely used to describe particular embodiments, and are not intended to limit the present disclosure. Singular forms in the present disclosure are intended to include the plural forms and vice versa, unless the context clearly indicates otherwise. It will be further understood that terms such as "including" or "having," etc., are intended to indicate the existence of the stated features, numbers, operations, actions, components, parts, or combinations thereof but not to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. The terms having the definitions as defined in the dictionary should be understood such that they have meanings consistent with the context of the related technique. So far as not being clearly defined in this application, terms should not be understood in an ideally or excessively formal way.

In describing embodiments, description of techniques that are well known to the art to which the present disclosure pertains and not directly related to the present disclosure is omitted. This is done to more clearly depict aspects and features of the present disclosure.

Various embodiments of the present disclosure will be described in detail with reference to the accompanying drawings in order for those skilled in the art to be able to readily implement the present invention.

FIG. 1 is a diagram illustrating a memory system (or a storage device) 50 in accordance with an embodiment of the present disclosure.

Referring to FIG. 1, the memory system 50 may include a memory device 100 and a controller 200 for controlling the memory device 100 under the control of a host 300. The memory device 100 may be a volatile memory device in which stored data disappears when power is cut off or a nonvolatile memory device in which stored data is retained even when power is cut off.

The host 300 may communicate with the memory system 50, using at least one of various communication schemes.

The controller 200 may control overall operations of the memory system 50, and control data exchange between the host 300 and the memory device 100. For example, the controller 200 may control the memory device 100 to store data in response to a request from the host 300.

The controller 200 may include a data receiver 210, a pattern determiner 220, a data storage 230 and a data outputter 240. The data receiver 210 may receive a plurality of input data IN_DATA from the host 300. The input data IN_DATA may be a command for the memory device 100 to perform an operation or data for identifying an address. The input data IN_DATA may include a pattern of data corresponding to the command or address.

The plurality of input data IN_DATA may include patterns, respectively. The plurality of input data IN_DATA may be sequentially input to the data receiver 210 for every input period. The data receiver 210 may provide the received input data IN_DATA to the pattern determiner 220 or the data storage 230. The input data IN_DATA may include a specific pattern. The input period may be set in any suitable way, e.g., in accordance with a clock CLK signal. That is, the input period may be synchronized with the period of clock CLK.

In an embodiment, when the data receiver 210 receives input data IN_DATA including a pattern representing a refresh command, the data receiver 210 may not provide the data storage 230 with input data IN_DATA input for a certain input period. That is, the data receiver 210 may exclude data input for a certain input period, and provide the data storage 230 with input data IN_DATA received after the certain input period.

The pattern determiner 220 may set, as a reference pattern REP_PAT, any one pattern among the patterns respectively included in the plurality of input data IN_DATA. When the reference pattern REP_PAT is set, the pattern determiner 220 may determine whether a pattern IN_PAT included in the input data IN_DATA corresponds to the reference pattern REP_PAT. When the pattern IN_PAT corresponds to the reference pattern REP_PAT, the pattern determiner 220 may generate and output a control signal CTRL_SIG for outputting a capture data CAP_DATA to be stored in the data storage 230.

The data storage 230 may store the plurality of input data IN_DATA provided from the data receiver 210. The data stored in the data storage 230 may include capture data CAP_DATA. The data stored in the data storage 230 may be provided to the data outputter 240. The data storage 230 may store new input data IN_DATA received from the data receiver 210.

The data outputter 240 may provide the data including the capture data CAP_DATA, which are stored in the data storage 230, to the memory device 100 or another controller for controlling the memory device 100. In another embodiment, the data outputter 240 may provide the data stored in the data storage 230 to another memory system. The data output from the data outputter 240 may be used to analyze patterns of the plurality of input data IN_DATA provided from the host 300.

In some embodiments, the memory device 100 may include any of a double data rate synchronous dynamic random access memory (DDR SDRAM), a DDR4 SDRAM, a low power double data rate4 (LPDDR4) SDRAM, a graphics double data rate (GDDR) SDRM, a low power DDR (LPDDR) SDRAM, and a Rambus dynamic random access memory (RDRAM).

Figure 2:
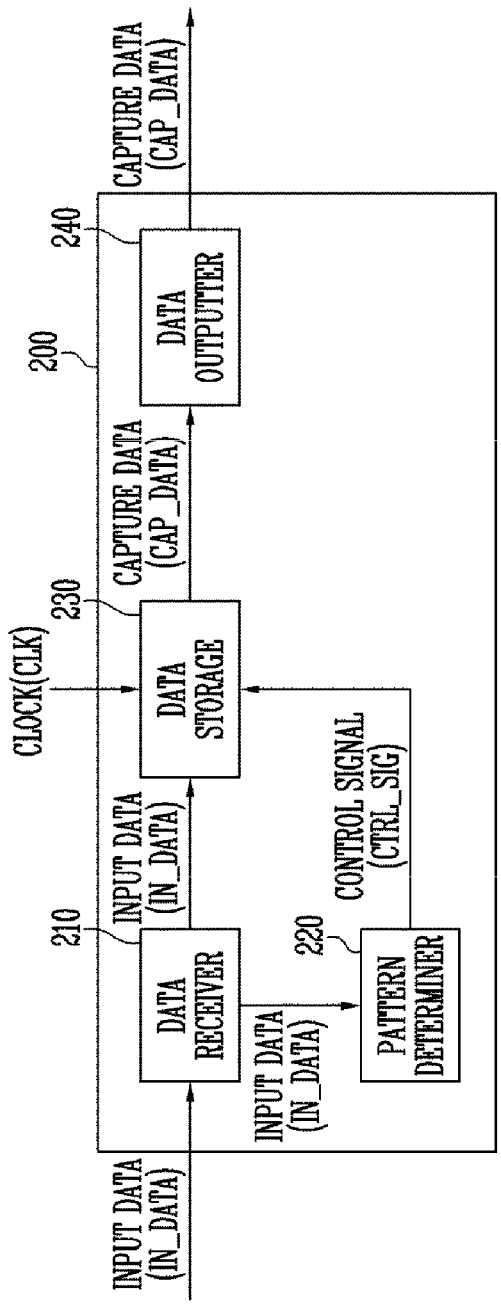
FIG. 2 is a diagram illustrating a controller in accordance with an embodiment of the present disclosure.

FIG. 2 is a diagram illustrating a controller, e.g., the controller 200 of FIG. 1, in accordance with an embodiment of the present disclosure.

Referring to FIG. 2, the memory controller 200 may include a data receiver 210, a pattern determiner 220, a data storage 230, and a data outputter 240.

The data receiver 210 may receive a plurality of input data IN_DATA from the host 300. The input data IN_DATA may be data representing a command or address. The input data IN_DATA may include a pattern for identifying data. The pattern for identifying data may be a pattern for identifying a command or address. The pattern for identifying a command or address may be a pattern of an input signal constituting the command or address. The data receiver 210 may sequentially receive a plurality of input data IN_DATA each including a pattern for identifying data for every input period.

Specifically, input signals constituting command or address data may be in a high status or low status. The pattern included in the input data IN_DATA may be a combination of a plurality of input signals. Specifically, when each input signal constituting a command or address is in the high status, the input signal may be a logic high level, e.g., "1." When each input signal constituting a command or address is in the low status, the input signal may be a logic low level, e.g., "0." Therefore, the pattern of data may be a pattern of 1's and 0's. The pattern of command or address data may become a reference for distinguishing commands or addresses from each other. That is, the pattern of data may be changed for each command or each address.

The pattern determiner 220 may receive a plurality of input data IN_DATA from the data receiver 210. Each of the plurality of input data IN_DATA may include a pattern for identifying data. The pattern determiner 220 may set, as a reference pattern REP_PAT, any one pattern among the patterns respectively included in the plurality of input data IN_DATA. The pattern set as the reference pattern REP_PAT may be one pattern or two or more consecutive patterns.

The pattern determiner 220 may determine whether a pattern included in input data IN_DATA corresponds to the reference pattern REP_PAT. The input data IN_DATA including the same pattern as the reference pattern REP_PAT may be correspondence data. The pattern determiner 220 may generate and output a control signal CTRL_SIG, based on whether the correspondence data has been input.

The pattern determiner 220 may output the control signal CTRL_SIG for controlling the data storage 230, based on whether the pattern included in the input data IN_DATA corresponds to the reference pattern REP_PAT. Specifically, the control signal CTRL_SIG may be in an inactive status before the pattern included in the input data IN_DATA corresponds to the reference pattern REP_PAT. When the pattern included in the input data IN_DATA corresponds to the reference pattern REP_PAT, the pattern determiner 220 may change the status of the control signal CTRL_SIG from the inactive status to an active status. When the pattern included in the input data IN_DATA does not correspond to the reference pattern REP_PAT, the pattern determiner 220 may maintain the control signal CTRL_SIG to be in the inactive status.

The data storage 230 may store the plurality of input data IN_DATA provided from the data receiver 210 in a sequence in which the plurality of input data IN_DATA are input. The data storage 230 may sequentially receive the plurality of input data IN_DATA one by one from the data receiver 210. The data storage 230 may store the plurality of input data IN_DATA provided from the data receiver 210 in synchronization with a clock CLK. Specifically, when the status of the clock CLK is changed from the low status to the high status, one input data IN_DATA among the plurality of input data IN_DATA may be stored in the data storage 230. The number of data stored in the data storage 230 may be changed depending on the size of a shift register 231 (see FIG. 5).

The data storage 230 may receive the control signal CTRL_SIG from the pattern determiner 220. The control signal CTRL_SIG may be in the active status or inactive status.

When the control signal CTRL_SIG is in the inactive status, a pattern included in the input data IN_DATA may not correspond to the reference pattern REP_PAT. When the control signal CTRL_SIG is in the inactive status, the data storage 230 may not output the stored data to the data outputter 240. When the control signal CTRL_SIG is in the inactive status, the data storage 230 may receive new input data IN_DATA from the data receiver 210. When the data storage 230 receives the new input data IN_DATA from the data receiver 210, the data stored in the data storage 230 may be shifted.

When the control signal CTRL_SIG is in the active status, the pattern included in the input data IN_DATA may correspond to the reference pattern REP_PAT. The input data IN_DATA including the pattern corresponding to the reference pattern REP_PAT may be correspondence data. When the control signal CTRL_SIG is in the active status, the data storage 230 may provide the stored data to the data outputter 240. Input data IN_DATA including the correspondence data may be stored in the data storage 230. The data storage 230 may provide capture data CAP_DATA including the correspondence data to the data outputter 240. The capture data CAP_DATA may be data stored in the shift register 231 of FIG. 5 when the data storage 230 provides the data to the data outputter 240.

The data outputter 240 may receive the capture data CAP_DATA from the data storage 230. The capture data CAP_DATA may be data output when the pattern included in the input data IN_DATA corresponds to the reference pattern REP_PAT.

The data outputter 240 may provide the memory device 100 with the capture data CAP_DATA stored in the data storage 230. In another embodiment, the data outputter 240 may provide another memory system with the capture data CAP_DATA stored in the data storage 230. The capture data CAP_DATA output from the data outputter 240 may be used to analyze patterns of the plurality of input data IN_DATA provided from the host 300.

Figure 3:
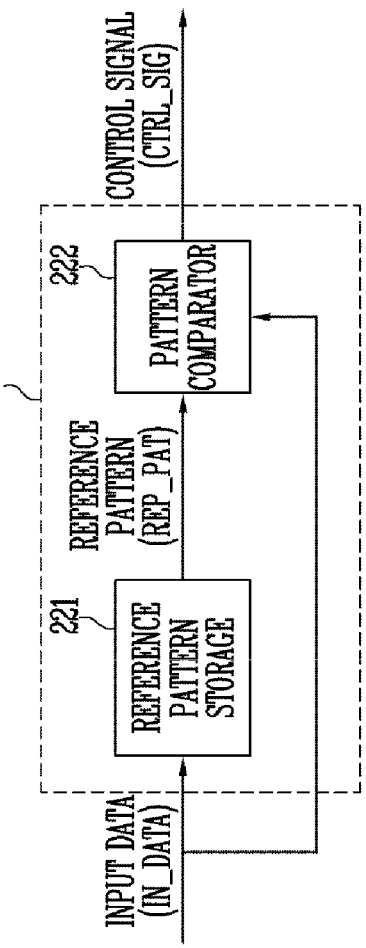
FIG. 3 is a diagram illustrating an exemplary structure of a pattern determiner, e.g., that of FIG. 2.

FIG. 3 is a diagram illustrating a structure of a pattern determiner, e.g., the pattern determiner 220 of FIG. 2, in accordance with an embodiment of the present disclosure.

Referring to FIG. 3, the pattern determiner 220 may include a reference pattern storage 221 and a pattern comparator 222. The reference pattern storage 221 and the pattern comparator 222 may receive input data IN_DATA from the data receiver 210 of FIG. 2.

The reference pattern storage 221 may set, as a reference pattern REP_PAT, any one pattern among patterns respectively included in a plurality of input data IN_DATA. The reference pattern REP_PAT may be a pattern included in data representing a command or address. The reference pattern REP_PAT may be a pattern included in data corresponding to one command or one address. The reference pattern REP_PAT may be patterns included in data input between two commands.

When the reference pattern REP_PAT is set, the reference pattern storage 221 may provide the reference pattern REP_PAT to the pattern comparator 222.

The pattern comparator 222 may receive the reference pattern REP_PAT from the reference pattern storage 221. When the pattern comparator 222 receives the reference pattern REP_PAT, the pattern comparator 222 may determine whether the patterns respectively included in the plurality of input data IN_DATA received from the data receiver 210 correspond to the reference pattern REP_PAT. The pattern comparator 222 may determine the active status or inactive status of a control signal CTRL_SIG, based on whether a pattern included in input data IN_DATA corresponds to the reference pattern REP_PAT. The control signal CTRL_SIG may control the data storage 230 of FIG. 2.

The pattern comparator 222 may maintain the control signal CTRL_SIG to be in the inactive status before the pattern included in the input data IN_DATA corresponds to the reference pattern REP_PAT. When the pattern included in the input data IN_DATA corresponds to the reference pattern REP_PAT, the pattern comparator 222 may change the status of the control signal CTRL_SIG from the inactive status to the active status. Then, the pattern comparator 222 may output the control signal CTRL_SIG of which status is changed to the active status.

When correspondence data including the same pattern as the reference pattern REP_PAT among the plurality of input data IN_DATA is input multiple times, e.g., three times, the pattern comparator 222 may change the status of the control signal CTRL_SIG from the inactive status to the active status, based on a set correspondence number. Then, the pattern comparator 222 may output the control signal CTRL_SIG of which status is changed to the active status.

The pattern comparator 222 may provide the data storage 230 with the control signal CTRL_SIG in the inactive status or the control signal CTRL_SIG in the active status.

Figure 4:
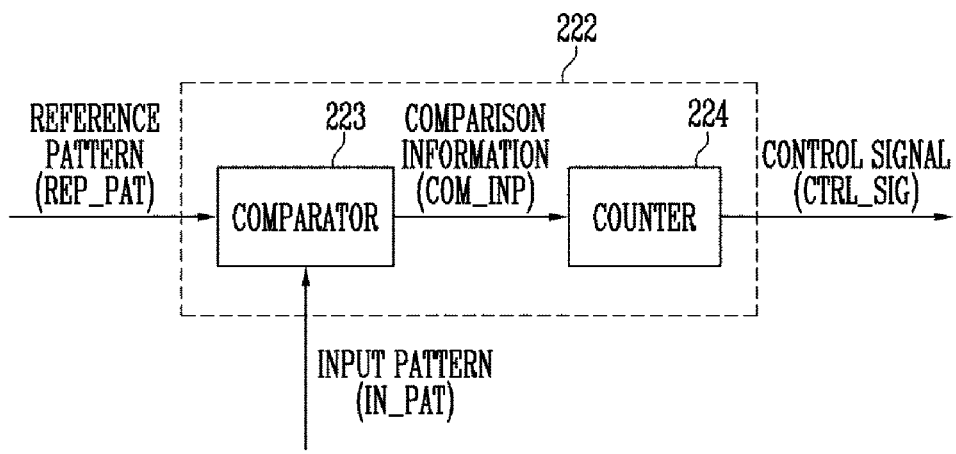
FIG. 4 is a diagram illustrating an exemplary structure of a pattern comparator, e.g., of FIG. 3.

FIG. 4 is a diagram illustrating a structure of a pattern comparator, e.g., the pattern comparator 222 of FIG. 3, in accordance with an embodiment of the present disclosure.

Referring to FIG. 4, the pattern comparator 222 may include a comparator 223 and a counter 224.

The comparator 223 may determine whether any one pattern IN_PAT among patterns respectively included in a plurality of input data IN_DATA corresponds to the reference pattern REP_PAT. The comparator 223 may generate comparison information COM_INP by determining whether a pattern IN_PAT included in input data IN_DATA corresponds to the reference pattern REP_PAT. The comparison information COM_INP may include information on whether the pattern IN_PAT included in the input data IN_DATA corresponds to the reference pattern REP_PAT. The comparator 223 may provide the comparison information COM_INP to the counter 224.

The counter 224 may store a count value for changing the status of the control signal CTRL_SIG to the inactive status. When the stored count value is equal to the number at which the pattern included in the input data IN_DATA corresponds to the reference pattern REP_PAT, the counter 224 may change the status of the control signal CTRL_SIG from the inactive status to the active status. That is, the counter 224 may change the status of the control signal CTRL_SIG from the inactive status to the active status according to the number at which the same pattern as the reference pattern REP_PAT is input.

The counter 224 may count the number at which the pattern included in the input data IN_DATA corresponds to the reference pattern REP_PAT, based on the comparison information COM_INP. When the comparison information COM_INP represents that the pattern included in the input data IN_DATA does not correspond to the reference pattern REP_PAT, the counter 224 may not count the number at which the pattern included in the input data IN_DATA corresponds to the reference pattern REP_PAT. When the comparison information COM_INP represents that the pattern included in the input data IN_DATA corresponds to the reference pattern REP_PAT, the counter 224 may count the number at which the pattern included in the input data IN_DATA corresponds to the reference pattern REP_PAT.

The counter 224 may determine whether the control signal CTRL_SIG provided to the data storage 230 is in the active status or inactive status, based on the comparison information COM_INP. Specifically, the counter 224 may determine whether the control signal CTRL_SIG provided to the data storage 230 is in the active status or inactive status according to the number at which the pattern included in the input data IN_DATA corresponds to the reference pattern REP_PAT.

Figure 5:
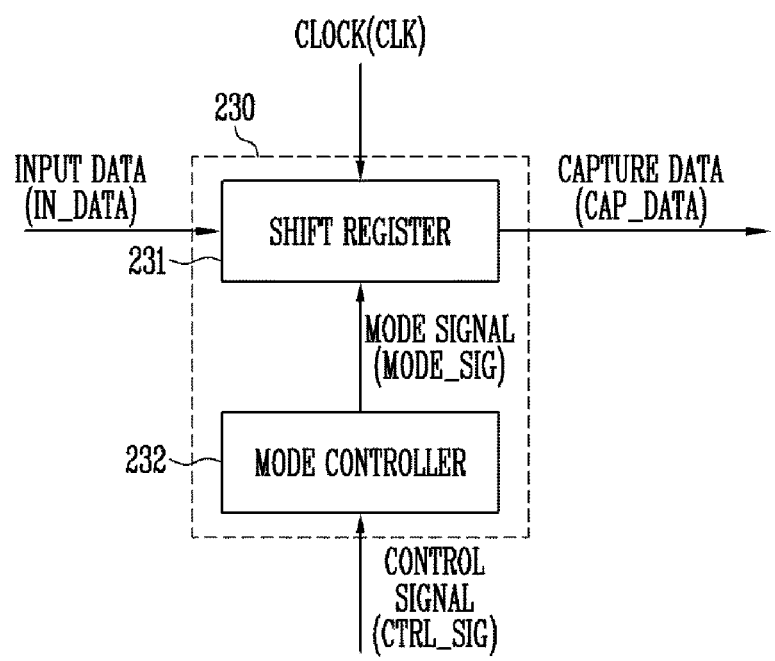
FIG. 5 is a diagram illustrating a data storage in accordance with an embodiment of the present disclosure.

FIG. 5 is a diagram illustrating a data storage, e.g., the data storage 230 of FIG. 2, in accordance with an embodiment of the present disclosure.

Referring to FIG. 5, the data storage 230 may include a shift register 231 and a mode controller 232.

The shift register 231 may store a plurality of input data IN_DATA sequentially received from the data receiver 210 of FIG. 2. The shift register 231 may store the input data IN_DATA to be synchronized with the clock CLK. Specifically, the shift register 231 may store any one data among the plurality of input data IN_DATA when the status of the clock CLK is changed from the low status to the high status or when the status of the clock CLK is changed from the high status to the low status. A pattern included in any one of the plurality of input data IN_DATA may be a pattern included in one command data or one address data.

The mode controller 232 may generate a mode signal MODE_SIG, based on the control signal CTRL_SIG. The mode signal MODE_SIG may determine whether new input data is to be stored in the shift register 231 or whether data stored in the shift register 231 are to be output.

Specifically, the mode controller 232 may generate and output the mode signal MODE_SIG in the inactive status before the mode controller 232 receives the control signal CTRL_SIG of which status is changed to the inactive status. When the mode controller 232 receives the control signal CTRL_SIG of which status is changed to the active status, the mode controller 232 may generate the mode signal MODE_SIG in the active status.

In an embodiment, the mode controller 232 may change the status of the mode signal MODE_SIG from the inactive status to the active status after a certain input period from when the control signal CTRL_SIG of which status is changed to the active status is input. The input period may correspond to the number at which the clock CLK is repeated. The input period may correspond to the number at which input data IN_DATA are synchronized with the clock CLK. When the status of the mode signal MODE_SIG is changed to the active status, the shift register 231 may output data stored in the shift register 231 in response to the mode signal MODE_SIG of which status is changed to the active status. The data output from the shift register 231 may be data stored in the shift register 231 when the shift register 231 receives the mode signal MODE_SIG.

When the mode controller 232 receives the control signal CTRL_SIG in the inactive status, the mode controller 232 may maintain the mode signal MODE_SIG to be in the inactive status, and output the mode signal MODE_SIG. The shift register 231 receiving the mode signal MODE_SIG of which status is changed to the inactive status from the mode controller 232 may receive new input data IN_DATA from the data receiver 210. When the new input data IN_DATA are received from the data receiver 210, data that have already been stored in the shift register 231 may be shifted.

When the shift register 231 receives the mode signal MODE_SIG in the inactive status from the mode controller 232, the shift register 231 may not output the stored data. When the shift register 231 receives the mode signal MODE_SIG in the inactive status from the mode controller 232, the shift register 231 may store the new input data IN_DATA.

Specifically, the shift register 231 may store the new input data IN_DATA received from the data receiver 210, and no longer store some of the data that have already been stored. In an embodiment, the shift register 231 may store the plurality of input data IN_DATA received from the data receiver 210 while the mode signal MODE_SIG in the inactive status is being received. The shift register 231 may sequentially store the plurality of input data IN_DATA received from the data receiver 210 one by one in a sequence in which the plurality of input data IN_DATA are input for every input period. The storage positions of the data that have already been stored in the shift register 231 may be changed for every input period. When the storage position of any one data among the data that have already been stored in the shift register 231 is not changed or cannot be changed, the shift register 231 may no longer store the corresponding data.

Figures 6, 7, 8:
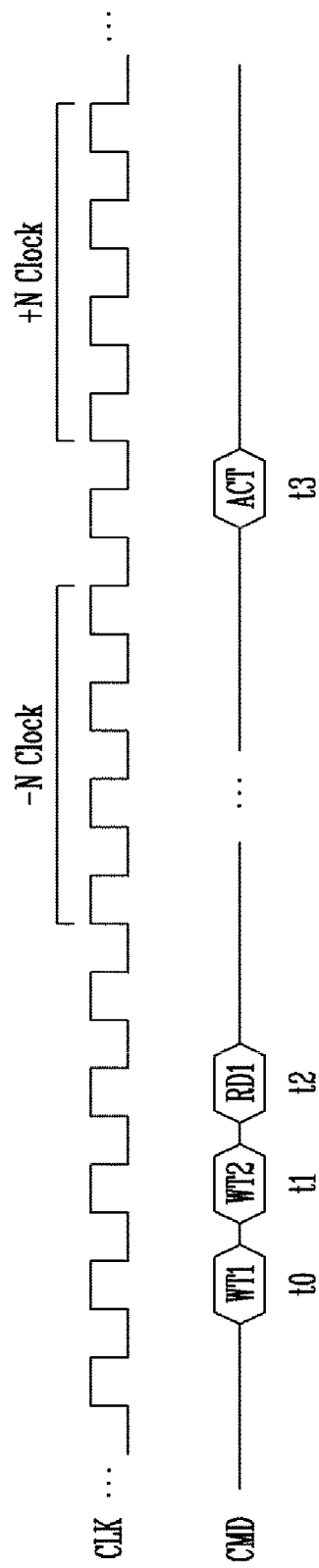
FIG. 6 is a diagram illustrating a method for identifying a plurality of input data received by a data receiver.
FIG. 7 is a diagram illustrating patterns respectively included in the plurality of input data of FIG. 6.
FIG. 8 is a diagram illustrating a method for outputting capture data in accordance with an embodiment of the present disclosure.

FIG. 6 is a diagram illustrating a method for identifying a plurality of input data received by a data receiver, e.g., the data receiver 210 of FIGS. 1 and 2.

Referring to FIG. 6, the data receiver 210 may receive input data IN_DATA representing a command. The command may be any one of an active command ACT, a write command WT, a read command RD, and a refresh command REFRESH. The command may be another command, i.e., other than the active command ACT, the write command WT, the read command RD, and the refresh command REFRESH.

In an embodiment, each command may be configured with input signals chip select (CS), row access strobe (RAS), column access strobe (CAS), and write enable (WE). Each command may be configured with other input signals, i.e., other than the CS, RAS, CAS, and WE signals. The input signals may be signals input to different input pins, respectively. The data receiver 210 may determine a pattern included in the input data IN_DATA received to the data receiver 210, based on the input signals.

In an embodiment, the input signals may be in a low status corresponding to a logic low level L or high status corresponding to a logic high level H.

The active command ACT may be configured with the input signals CS, RAS, CAS, and WE. The active command ACT may be a command when the CS and RAS signals in the low status L and the CAS and WE signals in the high status H are input to the respective input pins. The active command ACT may be configured with other input signals, i.e., other than the CS, RAS, CAS, and WE signals. The active command ACT may be identified by the other input signals.

The write command WT may be configured with the input signals CS, RAS, CAS, and WE. The write command WT may be a command when the CS, CAS, and WE signals in the low status L and the RAS signal in the high status H are input to the respective input pins. The write command WT may be configured with other input signals, i.e., other than the CS, RAS, CAS, and WE signals. The write command WT may be identified by the other input signals.

The read command RD may be configured with the input signals CS, RAS, CAS, and WE. The read command RD may be a command when the CS and CAS signals in the low status L and the RAS and WE signals in the high status H are input to the respect input pins. The read command RD may be configured with other input signals, i.e., other than the CS, RAS, CAS, and WE signals. The read command RD may be identified by the other input signals.

The refresh command REFRESH may be configured with the input signals CS, RAS, CAS, and WE. The refresh command REFRESH may be a command when the CS, RAS, and CAS signal in the low status L and the WE signal in the high status H are input to the respective input pins. The refresh command REFRESH may be configured with other input signals, i.e., other than the CS, RAS, CAS, and WE signals. The refresh command REFRESH may be identified by the other input signals.

FIG. 7 is a diagram illustrating patterns respectively included in the plurality of input data of FIG. 6.

Referring to FIGS. 6 and 7, each of the plurality of input data IN_DATA received to the data receiver 210 may include patterns, and each pattern may be a pattern of data corresponding to a command. A pattern included in input data IN_DATA may be determined according to an input signal constituting the command.

In an embodiment, each command may be configured with the input signals CS, RAS, CAS, and WE. Each command may be configured with other input signals, i.e., other than the CS, RAS, CAS, and WE signals. The input signals may be signals input to different input pins, respectively. A pattern included in input data IN_DATA input to the data receiver 210 may be determined based on the input signals.

In an embodiment, the input signals in the low status L or high status H.

The active command ACT may be a command when the CS and RAS signals in the low status L and the CAS and WE signals in the high status H are input to the respective input pins. In order to determine a pattern included in data representing the active command ACT, the low status L among the statuses of the signals constituting the active command ACT may be determined as a logic low level "0," and the high status H among the statuses of the signals constituting the active command ACT may be determined as a logic high level "1." Therefore, the pattern included in the data representing the active command ACT may be "0011."

The write command WT may be a command when the CS, CAS, and WE signals in the low status L and the RAS signal in the high status H are input to the respective input pins. In order to determine a pattern included in data representing the write command WT, the low status L among the statuses of the signals constituting the write command WT may be determined as a logic low level "0," and the high status H among the statuses of the signals constituting the write command WT may be determined as a logic high level "1." Therefore, the pattern included in the data representing the write command WT may be "0100."

The read command RD may be a command when the CS and CAS signals in the low status L and the RAS and WE signals in the high status H are input to the respective input pins. In order to determine a pattern included in data representing the read command RD, the low status L among the statuses of the signals constituting the read command RD may be determined as a logic low level "0," and the high status H among the statuses of the signals constituting the read command RD may be determined as a logic high level "1." Therefore, the pattern included in the data representing the read command RD may be "0101."

The refresh command REFRESH may be a command when the CS, RAS, and CAS signals in the low status L and the WE signal in the high status H are input to the respective input pins. In order to determine a pattern included in data representing the refresh command REFRESH, the low status L among the statuses of the signals constituting the refresh command REFRESH may be determined as a logic low level "0," and the high status H among the statuses of the signals constituting the refresh command REFRESH may be determined as a logic high level "1." Therefore, the pattern included in the data representing the refresh command REFRESH may be "0001."

FIG. 8 is a diagram illustrating a method for outputting capture data in accordance with an embodiment of the present disclosure.

Referring to FIG. 8, the reference pattern REP_PAT may be determined as a pattern included in input data IN_DATA representing the active command ACT. When the reference pattern REP_PAT is determined, and the pattern included in the input data IN_DATA corresponds to the reference pattern REP_PAT, data stored in the shift register 231 of FIG. 5 may be output. The number of input data IN_DATA stored in the shift register 231 may be determined according to the size of the shift register 231. A case where the shift register 231 is set to have a size capable of storing nine input data is assumed.

At t0, data representing a first write command WT1 may be stored in the shift register 231. The data representing the first write command WT1 may include a specific pattern. Specifically, when the status of the clock CLK is changed from the low status to the high status, the data representing the first write command WT1 may be stored in the shift register 231. After the data representing the first write command WT1 is stored in the shift register 231, the shift register 231 may store input data IN_DATA representing another command.

At t1, data representing a second write command WT2 may be stored in the shift register 231. The data representing the second write command WT2 may include a specific pattern. Specifically, when the status of the clock CLK is changed from the low status to the high status, the data representing the second write command WT2 may be stored in the shift register 231. After the data representing the second write command WT2 is stored in the shift register 231, the shift register 231 may store input data IN_DATA representing another command.

At t2, data representing a first read command RD1 may be stored in the shift register 231. The data representing the first read command RD1 may include a specific pattern. Specifically, when the status of the clock CLK is changed from the low status to the high status, the data representing the first read command RD1 may be stored in the shift register 231. After the data representing the first read command RD1 is stored in the shift register 231, the shift register 231 may store input data IN_DATA representing another command.

At t3, data representing an active command ACT may be stored in the shift register 231. A pattern included in the data representing the active command ACT may correspond to the reference pattern REP_PAT. When a pattern included in input data IN_DATA corresponds to the reference pattern REP_PAT, the shift register 231 may output capture data CAP_DATA including correspondence data, which is stored in the shift register 231. When the pattern included in the input data IN_DATA corresponds to the reference pattern REP_PAT, the shift register 231 may output data stored in the shift register 231 in response to the mode signal MODE_SIG of which status is changed to the active status.

Specifically, the mode controller 232 may change the status of the mode signal MODE_SIG from the inactive status to the active status after a certain input period from when the control signal CTRL_SIG of which status is changed to the active status is received. The input period may correspond to the number at which the clock CLK is repeated. The input period may correspond to the number at which input data IN_DATA is synchronized with the clock CLK. Therefore, after input data IN_DATA including the pattern corresponding to the reference pattern REP_PAT is received, the shift register 231 may output data stored during certain input periods corresponding to +N Clock and −N clock, based on the mode signal MODE_SIG of which status is changed to the active status after a certain input period corresponding to +N clock.

In an embodiment, at the t3, the input data IN_DATA including the pattern corresponding to the reference pattern REP_PAT may be input. Data stored in the shift register 231 may be output after a certain input period from when the input data IN_DATA including the pattern corresponding to the reference pattern REP_PAT is input. The data stored in the shift register 231 may be the capture data CAP_DATA including the correspondence data, which is stored in the shift register 231. Therefore, after the certain input period elapses, the nine input data, i.e., the capture data CAP_DATA stored in the shift register 231 may be output.

Figure 9A:
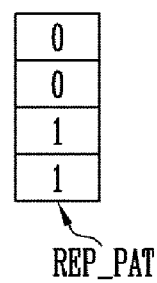
FIGS. 9A to 9B are diagrams illustrating a reference pattern and input data stored in a shift register, respectively.
Figure 9B:
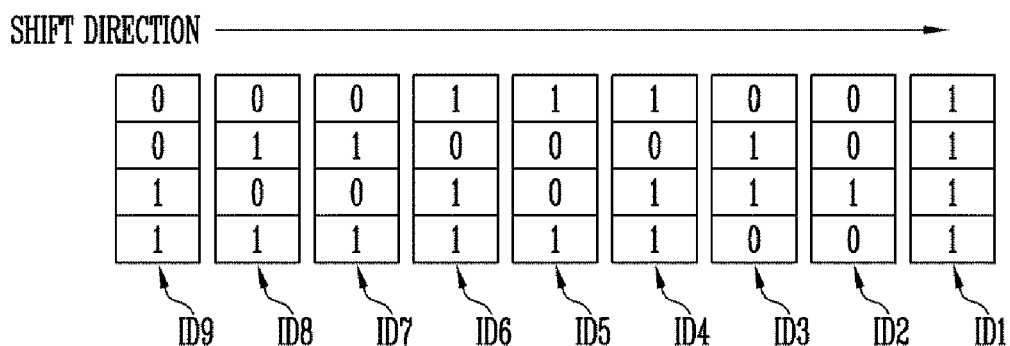

FIGS. 9A to 9B are diagrams illustrating a reference pattern and input data stored in a shift register, respectively, in accordance with an embodiment. The shift register may be the shift register 231 of FIG. 5.

FIG. 9A illustrates a reference pattern REP_PAT stored in the reference pattern storage 221 of FIG. 3. The reference pattern REP_PAT may be any one of patterns respectively included in a plurality of input data IN_DATA received to the data receiver 210 of FIG. 2. The reference pattern REP_PAT may be a pattern included in the data representing the active command ACT. Therefore, the reference pattern REP_PAT may be "0011."

FIG. 9B illustrates that first to ninth input data ID1 to ID9 are stored in the shift register 231 of FIG. 5. The number of input data IN_DATA stored in the shift register 231 may be determined according to the size of the shift register 231. A case where the shift register 231 is set to have a size capable of storing nine input data is assumed.

Hereinafter, a method for storing a plurality of input data IN_DATA in the shift register 231 will be described.

The shift register 231 may sequentially store a plurality of input data IN_DATA provided from the data receiver 210 for every input period. The shift register 231 may store the plurality of input data IN_DATA to be synchronized with the clock CLK. Specifically, when the status of the clock CLK is changed from the low status to the high status or when the status of the clock CLK is changed from the high status to the low status, the shift register 231 may store one of the plurality of input data IN_DATA. One pattern may be data representing one command or one address. Data representing a command or address may include a specific pattern.

The first input data ID1 may be input data IN_DATA firstly input to the shift register 231. A pattern included in the first input data ID1 may be "1111." The first input data ID1 may be stored in the shift register 231 when the status of the clock CLK is changed from the low status to the high status or when the status of the clock CLK is changed from the high status to the low status. After the first input data ID1 is stored, the shift register 231 may receive the second input data ID2.

The second input data ID2 may be input data IN_DATA input to the shift register 231 after the first input data ID1 is stored. A pattern included in the second input data ID2 may be "0010." In order to store the second input data ID2 in the shift register 231, the storage position of the first input data ID1 may be changed. Therefore, when the shift register 231 receives the second input data ID2, the shift register 231 may store the first input data ID1 at a position adjacent to that at which the first input data ID1 was stored. The second input data ID2 may be stored at the position at which the first input data ID1 was stored before the storage position of the first input data ID1 is changed.

The third input data ID3 may be input data IN_DATA input to the shift register 231 after the first input data ID1 and the second input data ID2 are stored in the shift register 231. A pattern included in the third input data ID3 may be "0110." In order to store the third input data ID3 in the shift register 231, the storage positions of the first input data ID1 and the second input data ID2 may be changed. Therefore, when the shift register 231 receives the third input data ID3, the shift register 231 may change the storage positions of the first input data ID1 and the second input data ID2, and store the first input data ID1 and the second input data ID2 at the changed storage positions. That is, the first input data ID1 may be stored at a position adjacent to that at which the first input data ID1 was stored. The second input data ID2 may be stored at the position at which the first input data ID1 was stored before the storage position of the first input data ID1 is changed. The third input data ID3 may be stored at the position at which the second input data ID2 was stored.

Subsequently, the fourth to ninth input data ID4 to ID9 may be stored in the shift register 231. Whenever input data IN_DATA including a pattern for identifying data is input, the storage positions of data stored in the shift register 231 may be changed. Therefore, in order to store new input data IN_DATA in the shift register 231, the storage positions of the data stored in the shift register 231 may be changed. That is, when the new input data IN_DATA is input, the data stored in the shift register 231 may be stored at positions at which data firstly input to the shift register 231 were stored. The new input data IN_DATA may be stored at the position at which data input before the new input data IN_DATA is input was stored.

In an embodiment, the ninth input data ID9 may be data lastly input to the shift register 231. The ninth input data ID9 may be input data IN_DATA including a pattern corresponding to the reference pattern REP_PAT. When the pattern included in the input data IN_DATA corresponds to the reference pattern REP_PAT, the pattern comparator 222 included in the pattern determiner 220 may change the status of the control signal CTRL_SIG from the inactive status to the active status. Therefore, when the ninth input data ID9 is input to the shift register 231, the pattern determiner 220 may change the status of the control signal CTRL_SIG from the inactive status to the active status. When the status of the control signal CTRL_SIG is changed from the inactive status to the active status, the mode controller 232 may change the status of the mode signal MODE_SIG from the inactive status to the active status after a certain input period. The mode signal MODE_SIG of which status is changed to the active status may be provided to the shift register 231. Then, the shift register 231 may output capture data CAP_DATA including correspondence data, which is stored in the shift register 231. When the shift register 231 outputs the capture data CAP_DATA, the data receiver 210 may no longer receive input data IN_DATA.

Figure 10A:
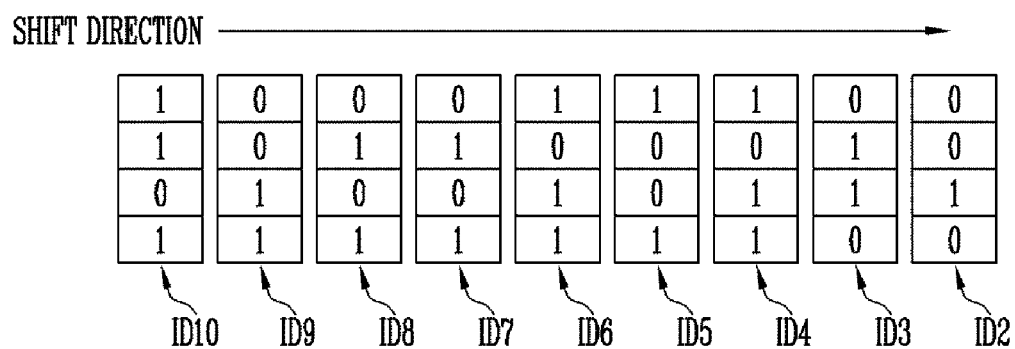
FIGS. 10A to 10B are diagrams illustrating examples of data input to a shift register among a plurality of input data for every certain period.
Figure 10B:
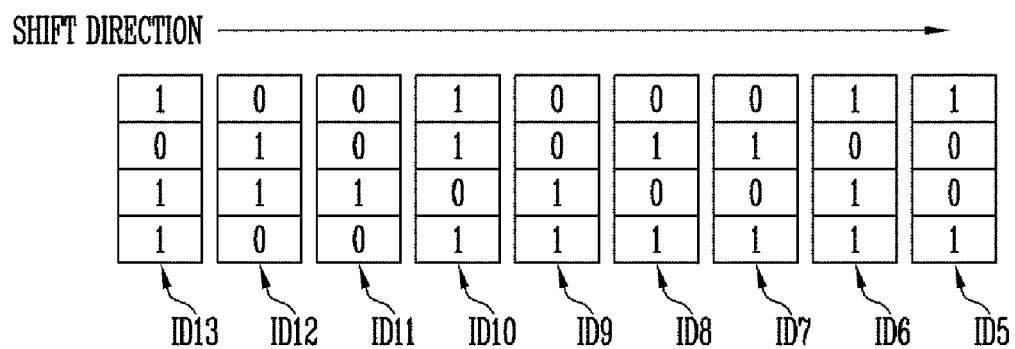

FIGS. 10A to 10B are diagrams illustrating examples of data input to a shift register among a plurality of input data for every certain period.

FIG. 10A illustrates a case where tenth input data ID10 is input after the first to ninth input data ID1 to ID9 are stored in the shift register 231 of FIG. 5, as shown in FIG. 9B. A pattern included in the tenth input data ID10 may be "1101." It is assumed that the shift register 231 can store nine input data.

After the first to ninth input data ID1 to ID9 are stored in the shift register 231, the tenth input data ID10 may be input to the shift register 231 during one input period. The pattern included in the ninth input data ID9 corresponds to the reference pattern REP_PAT, but this may be before the status of the mode signal MODE_SIG is changed from the inactive status to the active status. Therefore, the shift register 231 may receive the tenth input data ID10 that is a new input pattern. When the tenth input data ID10 is input to the shift register 231, the shift register 231 may store the tenth input data ID10 to be synchronized with the clock CLK during one input period.

In an embodiment, in order to store the tenth input data ID10 in the shift register 231, the first input data ID1 may no longer be stored in the shift register 231. In the example of FIGS. 10A to 10B, the shift register 231 stores nine input data, and therefore, the first input data ID1 may no longer be stored in the shift register 231.

Subsequently, the storage positions of the second to ninth input data ID2 to ID9 may be changed. The second to tenth input data ID2 to ID10 may be respectively stored at the positions at which the first to ninth input data ID1 to ID9 were stored before the storage positions of the second to ninth input data ID2 to ID9 are changed.

FIG. 10B illustrates a case where eleventh to thirteenth input data ID11 to ID13 are sequentially input to the shift register 231 of FIG. 5 during three input periods after the second to tenth input data ID2 to ID10 are stored in the shift register 231. It is assumed that the status of the mode signal MOD_SIG is changed from the inactive status to the active status after three input periods after the status of the control signal CTRL_SIG is changed from the inactive status to the active status.

In an embodiment, in order to store the eleventh to thirteenth input data ID11 to ID13 in the shift register 231, the shift register 231 may not store the second to fourth input data ID2 to ID4. Since the shift register 231 stores a maximum of nine input data IN_DATA, the second to fourth input data ID2 to ID4 may no longer be stored in the shift register 231.

In an embodiment, when the eleventh to thirteenth input data ID11 to ID13 are stored in the shift register 231, the storage positions of input data IN_DATA that have been stored in the shift register 231 may be changed. Therefore, in order to store new input data IN_DATA in the shift register 231, the storage positions of data stored in the shift register 231 may be changed. That is, whenever new input data IN_DATA is input, data stored in the shift register 231 may be stored at the positions at which input data first input to the shift register 231 were stored. The new input data IN_DATA may be stored at the position at which data input before the new input data IN_DATA is input was stored.

When the thirteenth input data ID13 is stored in the shift register 231, the mode controller 232 may change the status of the mode signal MODE_SIG from the inactive status to the active status. Then, the mode controller 232 may provide the shift register 231 with the mode signal MODE_SIG of which status is changed to the active status. The shift register 231 may output data stored therein in response to the mode signal MODE_SIG of which status is changed to the active status. The data stored in the shift register 231 may be capture data CAP_DATA including correspondence data. That is, since the pattern included in the ninth input data ID9 corresponds to the reference pattern REP_PAT, the control signal CTRL_SIG of which status is changed to the active status may be provided to the mode controller 232. When the mode controller 232 receives the control signal CTRL_SIG of which status is changed to the active status, the mode controller 232 may provide the shift register 231 with the mode signal MODE_SIG of which status is changed to the active status after four input periods.

The shift register 231 may output data stored therein, based on the mode signal MODE_SIG of which status is changed to the active status. The stored data may be capture data CAP_DATA including correspondence data. When the shift register 231 outputs the capture data CAP_DATA, the data receiver 210 may no longer receive input data IN_DATA.

FIG. 11 is a diagram illustrating a method for outputting capture data in accordance with an embodiment of the present disclosure.

Referring to FIG. 11, the reference pattern REP_PAT may be determined as a pattern included in input data IN_DATA representing the active command ACT. When the reference pattern REP_PAT is determined, and a pattern included in input data IN_DATA corresponds to the reference pattern REP_PAT, data stored in the shift register 231 may be output. It is assumed that the shift register 231 of FIG. 5 outputs data stored when input data IN_DATA secondly input among data including the pattern corresponding to the reference pattern REP_PAT is input.

At t4, data representing a first active command ACT1 may be stored in the shift register 231. Specifically, when the status of the clock CLK is changed from the low status to the high status, the data representing the first active command ACT1 may be stored in the shift register 231. After the data representing the first active command ACT1 is stored in the shift register 231, the shift register 231 may receive data representing another command. A pattern included in the data representing the first active command ACT1 is a pattern firstly corresponding to the reference pattern REP_PAT, and therefore, data stored in the shift register 231 may not be output.

At t5, data representing a second active command ACT2 may be stored in the shift register 231. Specifically, when the status of the clock CLK is changed from the low status to the high status, the data representing the second active command ACT2 may be stored in the shift register 231. A pattern included in the data representing the second active command ACT2 is a pattern secondly corresponding to the reference pattern REP_PAT, and therefore, data stored in the shift register 231 may be output. The data stored in the shift register 231 may be data stored in the shift register 231 after a certain input period corresponding to +N Clock after the data representing the second active command ACT2 is input. Therefore, the data stored in the shift register 231 may be data including data corresponding to the first active command ACT1 and the second active command ACT2. The data output from the shift register 231 may be capture data CAP_DATA including correspondence data input during certain input periods corresponding to +N Clock and −N Clock.

FIG. 12 is a diagram illustrating a method for outputting capture data in accordance with an embodiment of the present disclosure.

Referring to FIG. 12, the reference pattern REP_PAT may be determined as a pattern included in input data IN_DATA representing the active command ACT. When the reference pattern REP_PAT is determined, and a pattern included in input data IN_DATA corresponds to the reference pattern REP_PAT, data stored in the shift register 231 of FIG. 5 may be output.

At t6, data representing the active command ACT may be stored in the shift register 231. The data representing the active command ACT may include a specific pattern. Specifically, when the status of the clock CLK is changed from the low status to the high status, the data representing the active command ACT may be stored in the shift register 231. After the data representing the active command ACT is stored in the shift register 231, the shift register 231 may receive data representing another command.

Since the pattern included in the data representing the active command ACT is a pattern corresponding to the reference pattern REP_PAT, data stored in the shift register 231 may be output. Capture data CAP_DATA may be data stored in the shift register 231 after a certain input period after the data representing the active command ACT is input. That is, the capture data CAP_DATA may be data including correspondence data that is data including the pattern corresponding to the reference pattern REP_PAT.

After the data representing the active command ACT is input, data representing the refresh command REFRESH may be input. When the data representing the refresh command REFRESH is input, data representing commands CMD1 and CMD2 corresponding to the refresh command REFRESH may be neglected. That is, when the data receiver 210 of FIG. 2 receives input data IN_DATA representing the refresh command REFRESH, the data representing the commands CMD1 and CMD2 corresponding to the refresh command REFRESH may not be provided to the data storage 230. Therefore, data received during a certain input period 1201 after the data representing the refresh command REFRESH is received may not be stored in the shift register 231. The input period may correspond to the number at which the clock CLK is repeated.

Data corresponding to commands input during a certain input period after the data representing the active command ACT is input may be stored in the shift register 231. Therefore, data representing commands input during certain input periods +N Clock and −N Clock, except the data representing the commands CMD1 and CMD2 corresponding to the refresh command REFRESH, may be stored in the shift register 231. The shift register 231 may output capture data CAP_DATA including data stored therein.

Figure 13:
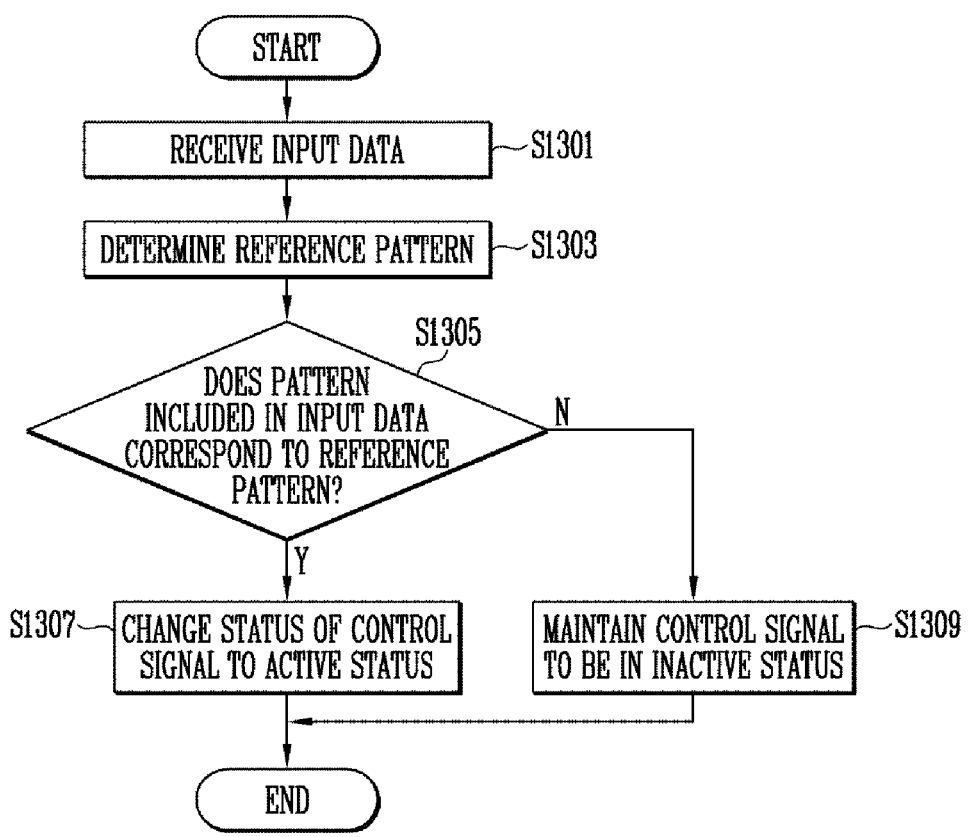
FIG. 13 is a flowchart illustrating an operation of a controller in accordance with an embodiment of the present disclosure.

FIG. 13 is a flowchart illustrating an operation of a controller, e.g., the controller 200 of FIG. 1, in accordance with an embodiment of the present disclosure.

Referring to FIG. 13, at step S1301, the data receiver 210 of FIGS. 1 and 2 may receive a plurality of input data IN_DATA from the host 300. The received input data IN_DATA may be data corresponding to a command or address necessary for a device to perform an operation. The device may be the memory device 100. Input data IN_DATA may include a pattern of data corresponding to a command or address.

At step S1303, a pattern included in one data among the plurality of input data IN_DATA may be set as a reference pattern REP_PAT. The set reference pattern REP_PAT may be stored in the reference pattern storage 221 of FIG. 3. When the reference pattern REP_PAT is determined, data stored in the shift register 231 of FIG. 5 may be output based on whether input data IN_DATA including a pattern corresponding to the reference pattern REP_PAT is input. The input data IN_DATA including the pattern corresponding to the reference pattern REP_PAT may be correspondence data. Capture data CAP_DATA may be data including the correspondence data, which are stored in the shift register 231.

At step S1305, it may be determined whether the pattern included in the input data IN_DATA corresponds to the reference pattern REP_PAT. The input data IN_DATA including the pattern corresponding to the reference pattern REP_PAT may be correspondence data. When it is determined that the pattern included in the input data IN_DATA corresponds to the reference pattern REP_PAT (S1305, Y), the controller 200 proceeds to step S1307. When it is determined that the pattern included in the input data IN_DATA does not correspond to the reference pattern REP_PAT (S1305, N), the controller 200 proceeds to step S1309.

At the step S1307, the pattern determiner 220 of FIG. 3 may change the status of a control signal CTRL_SIG to an active status. The control signal CTRL_SIG may be a signal for outputting data stored in the shift register 231 to the outside. Before the pattern included in the input data IN_DATA corresponds to the reference pattern REP_PAT, the control signal CTRL_SIG may be in an inactive status. When the pattern included in the input data IN_DATA corresponds to the reference pattern REP_PAT, the pattern determiner 220 may change the status of the control signal CTRL_SIG from the inactive status to the active status.

At the step S1309, when it is determined that the pattern included in the input data IN_DATA does not correspond to the reference pattern REP_PAT (S1305, N), the pattern determiner 220 may maintain the control signal CTRL_SIG to be in the inactive status. Before the pattern included in the input data IN_DATA corresponds to the reference pattern REP_PAT, the control signal CTRL_SIG may be in the inactive status.

Figure 14:
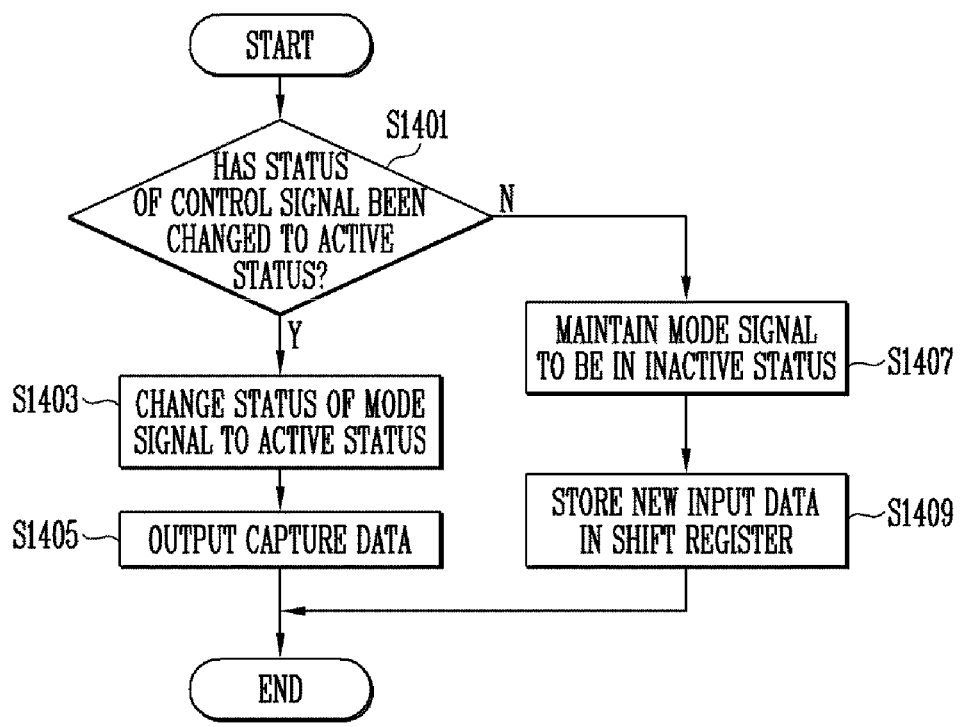
FIG. 14 is a flowchart illustrating an operation of the controller in accordance with another embodiment of the present disclosure.

FIG. 14 is a flowchart illustrating an operation of a controller, e.g., the controller 200 of FIG. 1, in accordance with another embodiment of the present disclosure.

Referring to FIG. 14, at step S1401, it may be determined whether the status of a control signal CTR_SIG output from the pattern determiner 220 of FIGS. 2 and 3 is changed to the active status. Before a pattern included in input data IN_DATA corresponds to a reference pattern REP_PAT, the control signal CTRL_SIG may be in the inactive status. When the pattern included in the input data IN_DATA corresponds to the reference pattern REP_PAT, the pattern determiner 220 may change the status of the control signal CTRL_SIG from the inactive status to the active status. When it is determined that the status of the control signal CTRL_SIG is changed from the inactive status to the active status (S1401, Y), the controller 200 proceeds to step S1403. When it is determined that the control signal CTRL_SIG maintains the inactive status (S1401, N), the controller 200 proceeds to step S1407.

At the step S1403, the mode controller 232 of FIG. 5 may generate a mode signal MODE_SIG, based on the control signal CTRL_SIG. The mode controller 232 may generate the mode signal MODE_SIG in the inactive status until before the mode controller 232 receives the control signal CTRL_SIG of which status is changed to the active status. When the mode controller 232 receives the control signal CTRL_SIG of which status is changed to the active status, the mode controller 232 may generate the mode signal MODE_SIG in the active status.

Specifically, the mode controller 232 may change the status of the mode signal MODE_SIG from the inactive status to the active status after a certain input period from when the control signal CTRL_SIG of which status is changed to the active status is input. The input period may correspond to the number at which a clock CLK is repeated. That is, the input period may correspond to the number at which input data IN_DATA is synchronized with the clock CLK. When the status of the mode signal MODE_SIG is changed to the active status, the shift register 231 may output data stored therein in response to the mode signal MODE_SIG of which status is changed to the active status. The data stored in the shift register 231 may be capture data CAP_DATA including correspondence data.

At step S1405, the shift register 231 receiving the mode signal MODE_SIG of which status is changed to the active status may output capture data CAP_DATA. The capture data CAP_DATA output from the shift register 231 may be data stored in the shift register 231 when the mode signal MODE_SIG of which status is changed to the active status is received.

At the step S1407, when the mode controller 232 receives the control signal CTRL_SIG in the inactive status, the mode controller 232 may maintain the mode signal MODE_SIG to be in the inactive status, and output the mode signal MODE_SIG.

At step S1409, the shift register 231 receiving the mode signal MODE_SIG in the inactive status from the mode controller 232 may receive new input data IN_DATA from the data receiver 210. When the new input data IN_DATA is received from the data receiver 210, the new input data IN_DATA may be sequentially provided to the shift register 231 in a sequence in which the new input data IN_DATA are input. The shift register 231 may sequentially store a plurality of input data IN_DATA received from the data receiver 210 one by one in a sequence in which the plurality of input data IN_DATA are input for every input period. The storage positions of data that have already stored in the shift register 231 may be changed for every input period. When the storage position of any one data among the data that have already been stored in the shift register 231 is not changed or cannot be changed, the shift register 231 may no longer store the corresponding data.

In accordance with embodiments of the present disclosure, a controller capable of outputting a pattern for analyzing input data and an operating method thereof are provided.

While the present disclosure has been shown and described with reference to certain embodiments thereof, it will be understood by those skilled in the art in light of the present disclosure that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure; the present disclosure is not limited thereto. That is, it should be apparent to those skilled in the art that various modifications can be made on the basis of the technological scope of the present disclosure.

Moreover, while specific terminologies are used to describe various embodiments of the present disclosure, such terminologies are used to explain the embodiments of the present disclosure, not limit them. Therefore, the present disclosure is not restricted to the above-described embodiments, as many variations are possible within the spirit and scope of the present disclosure. It should be apparent to those skilled in the art that various modifications can be made on the basis of the technological scope of the present disclosure in addition to the embodiments disclosed herein.

What is claimed is:

1. A controller comprising:
a data receiver configured to sequentially receive a plurality of input data, each including a pattern for identifying data for a corresponding input period of a plurality of input periods;
a pattern determiner configured to set, as a reference pattern, a pattern included in any one data among the plurality of input data, and generate a control signal based on whether correspondence data including the same pattern as the reference pattern is input; and
a data storage configured to store the plurality of input data in a sequence in which the plurality of input data are input, and, when the correspondence data is stored, output capture data that are stored data including the correspondence data based on the control signal,
wherein the pattern determiner includes:
a reference pattern storage configured to store a pattern set as the reference pattern; and
a pattern comparator configured to output the control signal based on whether any one of the patterns included in the plurality of input data corresponds to the reference pattern, wherein the data storage includes:
a shift register configured to store the plurality of input data sequentially received from the data receiver; and
a mode controller configured to determine whether new input data is to be stored in the shift register or whether the data stored in the shift register are to be output, based on the control signal, and
wherein, when the correspondence data is input multiple times, the pattern comparator changes the status of the control signal from an inactive status to an active status based on a set correspondence number, and outputs the control signal which is changed to the active status.

2. The controller of claim 1, further comprising a data outputter configured to receive the capture data based on the control signal, and provide the received capture data to an external device.

3. The controller of claim 1, wherein the input data includes data representing a command or address for a device to perform an operation.

4. The controller of claim 1, wherein the number of input data stored in the shift register is determined according to the size of the shift register,
wherein, when new input data is stored in the shift register, the new input data is stored after the data stored in the shift register are shifted.

5. The controller of claim 1, wherein, when any one of the patterns respectively included in the plurality of input data sequentially input to the pattern determiner corresponds to the reference pattern, the pattern comparator changes the status of the control signal from the inactive status to the active status, and output the control signal of which status is changed to the active status.

6. The controller of claim 1, wherein the mode controller changes the status of a mode signal from the inactive status to the active status after a certain input period from when the control signal in the active status is received from the pattern determiner, and outputs the mode signal of which status is changed to the active status.

7. The controller of claim 6, wherein the shift register outputs the stored data in response to the mode signal in the active status, which is received from the mode controller.

8. The controller of claim 5, wherein, when a pattern included in input data received to the pattern determiner among the plurality of input data does not correspond to the reference pattern, the pattern determiner maintains the control signal to be in the inactive status,
wherein, when the mode controller receives the control signal in the inactive status from the pattern comparator, the mode controller maintains the mode signal to be in the inactive status.

9. The controller of claim 8, wherein, when the mode controller outputs the mode signal in the inactive status, the data storage sequentially stores input data received from the data receiver among the plurality of input data in the shift register after the data stored in the shift register are shifted.

10. The controller of claim 9, wherein the shift register sequentially stores the plurality of input data one by one for every input period,
wherein storage positions of the data stored in the shift register are shifted for every input period.

11. The controller of claim 6, wherein, when the data receiver receives input data including a pattern representing a refresh command among the plurality of input data, the data receiver outputs, to the data storage, data stored during a certain input period, except data input during a certain input period, after data representing the refresh command is input.

12. A method for operating a controller, the method comprising:

sequentially receiving a plurality of input data, each including a pattern for identifying data for a corresponding input period of a plurality of input periods;

setting, as a reference pattern, a pattern included in any one data among the plurality of input data;

generating a control signal, based on whether correspondence data including the same pattern as the reference pattern is input;

storing the plurality of input data in a shift register in a sequence in which the plurality of input data are input, wherein, when the correspondence data among the plurality of input data is stored, outputting capture data that are stored data including the correspondence data based on the control signal, wherein the generating of the control signal further includes:

storing the reference pattern that is a pattern included in any one data among the plurality of input data; and generating the control signal, based on whether any one of the patterns respectively included in the plurality of input data corresponds to the reference pattern, when the correspondence data including the same pattern as the reference pattern is input multiple times, changing the status of the control signal from an inactive status to an active status, based on a set correspondence number, and outputting the control signal which is changed to the active status.

13. The method of claim 12, further comprising generating a mode signal for determining whether the data stored in the shift register are to be output, based on the control signal.

14. The method of claim 13, wherein the generating of the mode signal comprises changing the status of the mode signal from the inactive status to the active status after a certain input period from when the control signal in the active status is received.

15. The method of claim 14, wherein the outputting of the capture data comprises outputting the data stored in the shift register in response to the mode signal in the active status.

16. The method of claim 13, wherein the generating of the mode signal comprises when a pattern included in any one data among the plurality of input data does not correspond to the reference pattern, maintaining the inactive status of the control signal; and when the control signal in the inactive status is received, maintaining the inactive status of the mode signal.

17. The method of claim 16, further comprising:

when the mode signal in the inactive status is received, shifting the data stored in the shift register; and storing received input data among the plurality of input data in the shift register.

18. A controller comprising:

a data receiver configured to receive a plurality of input data, each including a pattern for identifying data;

a pattern determiner configured to set, reference patterns, patterns included in at least two data among the plurality of input data, and generate a control signal, based on whether correspondence data including the same patterns as the reference patterns are input; and a data storage configured to store the plurality of input data in a sequence in which the plurality of input data are input, and, when the correspondence data are stored, output capture data that are stored input data including the correspondence data, based on the control signal, wherein the pattern determiner includes:

a reference pattern storage configured to store a pattern set as the reference pattern; and a pattern comparator configured to output the control signal based on whether any one of the patterns included in the plurality of input data corresponds to the reference pattern, wherein the data storage includes:

a shift register configured to store the plurality of input data sequentially received from the data receiver; and a mode controller configured to determine whether new input data is to be stored in the shift register or whether the data stored in the shift register are to be output, based on the control signal, and wherein, when the correspondence data is input multiple times, the pattern comparator changes the status of the control signal from the inactive status to the active status based on a set correspondence number, and outputs the control signal which is changed to the active status.

19. A memory system comprising:

a memory device; and a controller suitable for:

sequentially receiving a plurality of input data from a host, the plurality of input data including a pattern for identifying data for a corresponding input period of a plurality of input periods;

setting, as a reference pattern, a pattern included in any one data among the plurality of input data;

generating a control signal, based on whether correspondence data including the same pattern as the reference pattern is input;

sequentially storing the plurality of input data in an order in which the plurality of input data are input, wherein the generating of the control signal further includes:

storing the reference pattern that is a pattern included in any one data among the plurality of input data; and generating the control signal, based on whether any one of the patterns respectively included in the plurality of input data corresponds to the reference pattern, wherein, when the correspondence data including the same pattern as the reference pattern is input multiple times, changing the status of the control signal from an inactive status to an active status, based on a set correspondence number, and outputting the control signal which is changed to the active status.

\* \* \* \* \*